L. R. VALENTINE.
WHEEL COASTER.
APPLICATION FILED SEPT. 14, 1908.
928,716.
Patented July 20, 1909.
3 SHEETS—SHEET 1.
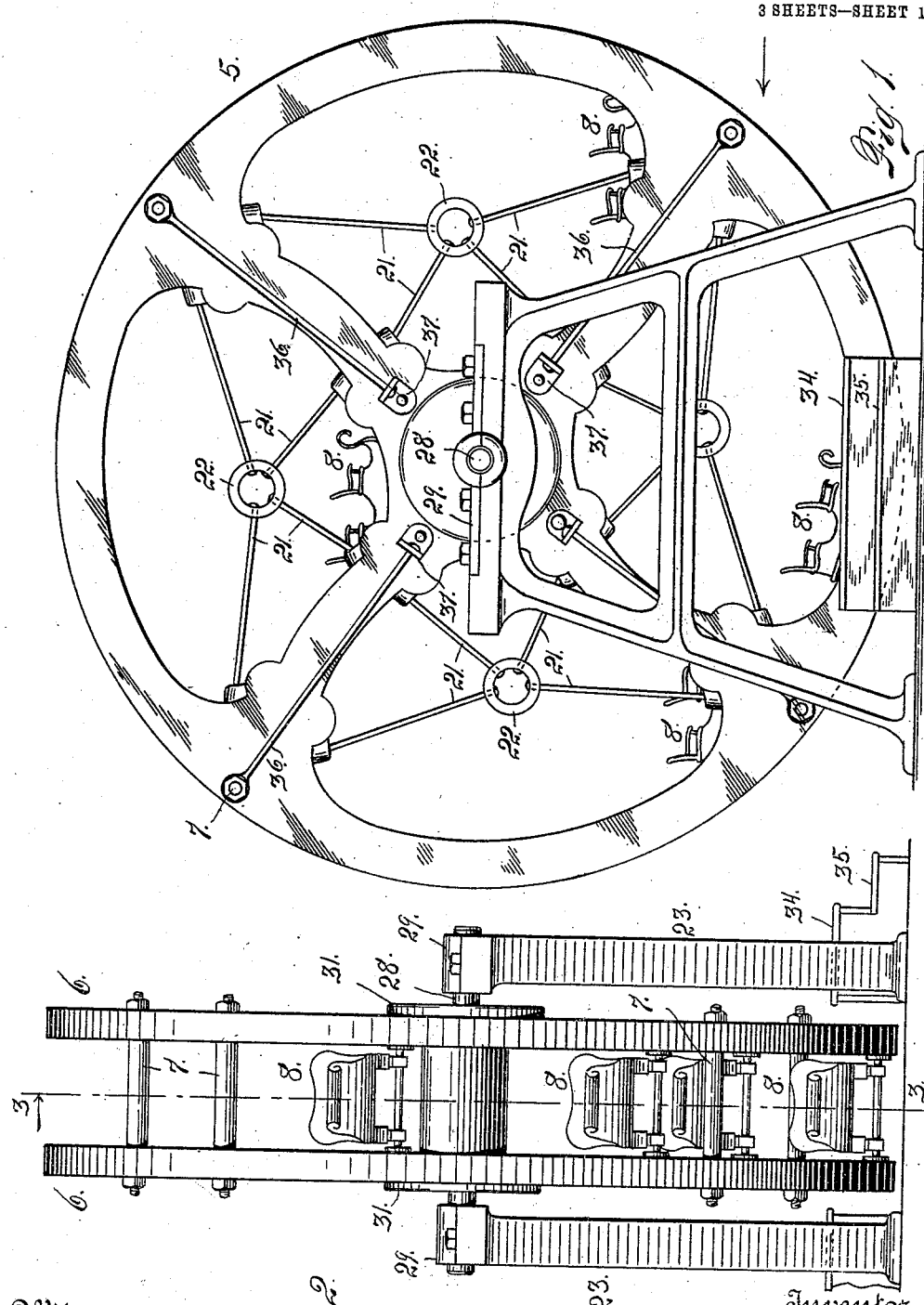

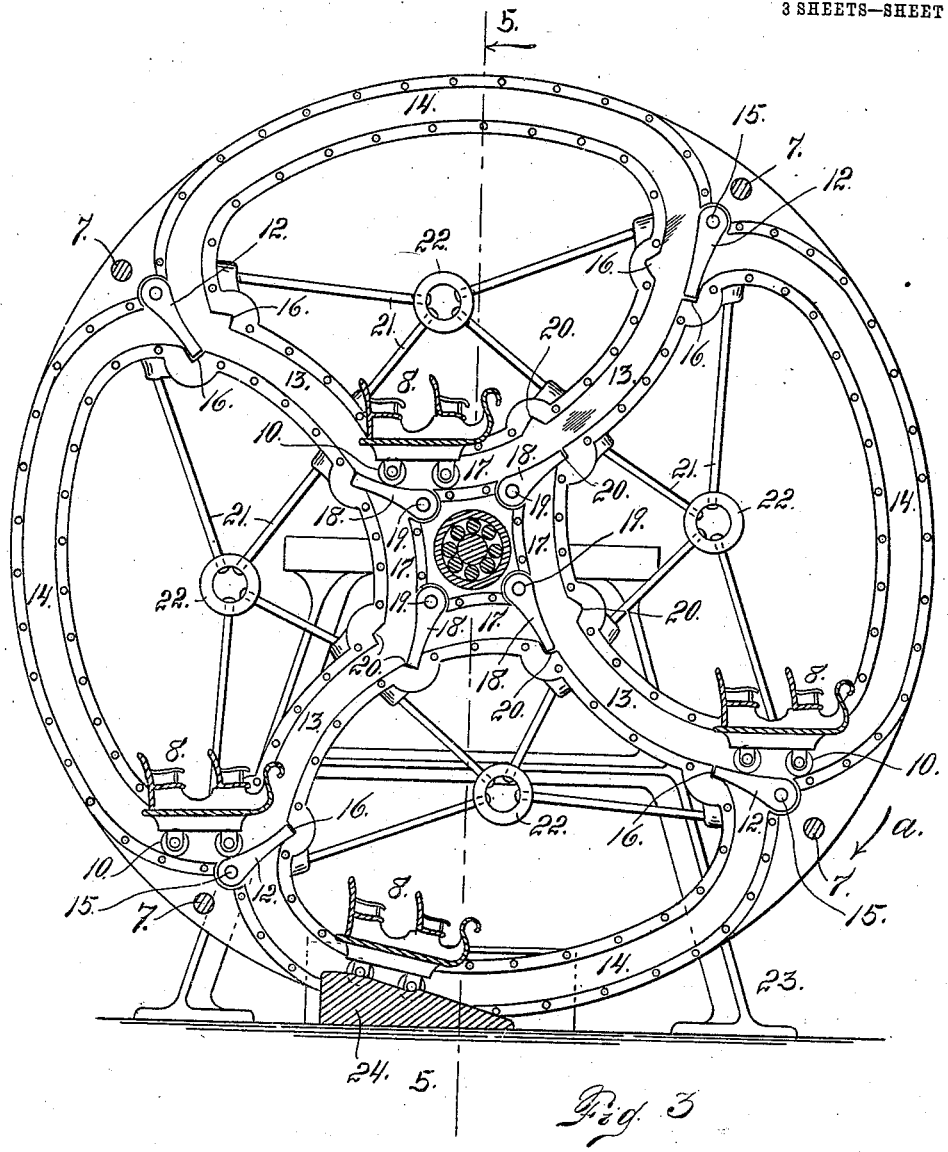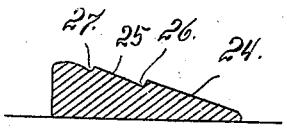

L. R. VALENTINE.
WHEEL COASTER.
APPLICATION FILED SEPT. 14, 1908.

928,716.

Patented July 20, 1909.
3 SHEETS—SHEET 3.

Witnesses

Inventor
L. R. Valentine.
By
Attorney

UNITED STATES PATENT OFFICE.

LOGAN R. VALENTINE, OF DENVER, COLORADO.

WHEEL-COASTER.

No. 928,716.　　　Specification of Letters Patent.　　　Patented July 20, 1909.

Application filed September 14, 1908. Serial No. 453,027.

*To all whom it may concern:*

Be it known that I, LOGAN R. VALENTINE, a citizen of the United States, residing in the city and county of Denver and State of Colorado, have invented certain new and useful Improvements in Wheel-Coasters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in amusement apparatus, in which a wheel of any suitable size is mounted to rotate and upon which cars or vehicles are mounted, the movement of the latter being automatically imparted by the rotation of the wheel, this movement being due entirely to gravity.

In my improved construction my wheel is provided with a number of distinct sections or portions, each having a track or orbit within which the said car or vehicle is confined, or to which its travel is limited.

In the specific construction illustrated, and for the purpose of compactness, portions of the track of each orbit are common to the two adjacent orbits, automatically operated switches being employed to confine each vehicle to its own orbit and thereby prevent conflict between the various vehicles of the different orbits. At the bottom of the stationary framework forming the support for the wheel, is located an abutment which catches and for a short time retains each car while the wheel continues to move, the position of the vehicle's orbit being such that its track may travel some distance without interfering with the vehicle. This period of rest or interrupted movement to which the vehicle is subjected, is sufficient to give time for passengers to leave the vehicle and for others to enter the same, after which the car is automatically removed from the abutment and continues its travel through its individual orbit.

Having briefly outlined my improved construction, I will proceed to describe the same in detail, reference being made to the accompanying drawing in which is illustrated an embodiment thereof.

Figure 5:
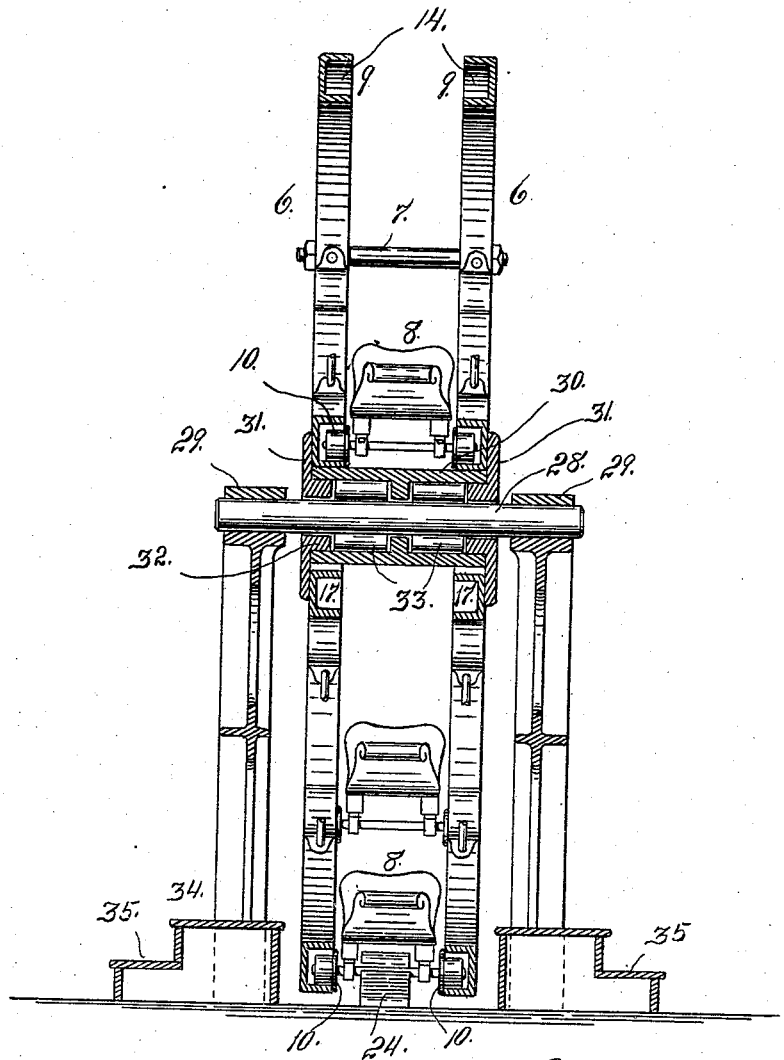
Figure 6:
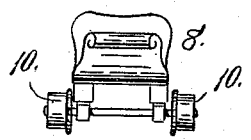
Figure 7:

In this drawing, Figure 1 is a side elevation of my coaster wheel. Fig. 2 is a front view of the same, or a view looking in the direction of the arrow in Fig. 1. Fig. 3 is a sectional view of the wheel and the vehicles mounted thereon, being a section taken on the line 3—3 Fig. 2. Fig. 4 is a sectional view of the abutment or temporary landing for the vehicles for the purpose of taking off and letting on passengers. Fig. 5 is a section taken approximately on the line 5—5 Fig. 3, the vehicles and abutment being shown in end elevation. Figs. 6 and 7 are front end and side elevations respectively, of one of the vehicles used in connection with my improved wheel coaster.

The same reference characters indicate the same parts in all the views.

Let the numeral 5 designate my improved wheel considered in its entirety. This wheel is composed of two parallel members 6, connected by tie-rods 7, the two members being spaced to permit a car 8 of suitable width to travel upon the wheel. Each member of the wheel is provided with grooves 9 arranged to form a number of track elements adapted to receive the wheels 10 of a vehicle or car 8, the grooves being open on the inside and the body of the car being located intermediate the track elements. The two adjacent track elements of each wheel member form a circuit or orbit for a single car which, by virtue of the employment of switches 12, is confined within its individual orbit, though portions 13 of each car's orbit also constitute parts of orbits of other cars.

In addition to the track parts 13 which are common to the track elements of adjacent vehicle orbits, each of these orbits is provided with portions 14. At the extremities of each track portion 14 are located the switches 12 which are pivoted at 15. The free extremity of each switch is adapted to engage two recesses 16, the switch being in engagement with the one recess or the other according to the position of the wheel, the position of the switch being controlled by gravity as the wheel rotates. The track portion 14 of each wheel member is located farthest from the center of the wheel or at the periphery thereof. Between the two track portions 13 and forming the portion of the track nearest the center of the wheel, each wheel member is provided with a short track portion 17. Two switches 18 are pivoted as shown at 19 to allow them to swing back and forth between two seats or notches 20, these switches being also controlled by gravity, their position depending upon the position of the wheel. All of the switches 12 and 18 form parts of the tracks which are engaged by the vehicle wheels.

From an inspection of the drawing it will be understood that the various orbits of the wheel are so arranged and shaped that there is no conflict between the various vehicles traveling in the different orbits.

In order to give strength and durability to the wheel members, each of these members is provided with a number of tie-rods 21, one extremity of each rod being connected with a floating ring 22 while the opposite extremities of these rods are connected with the track elements. The various vehicle orbits are thus reinforced and strengthened to prevent breakage or injury to the wheel while in motion.

At the bottom of the stationary framework 23 upon which the wheel is supported, is located an abutment which occupies a position between the two wheel members 6. This abutment is wedge-shaped, its extremity of least thickness being located in the direction toward which the wheel is traveling, the direction of rotation being indicated by the arrow in Fig. 3. This abutment, as the portions 14 of the track elements of each orbit reach their lowest position, engages the axles of the car, the latter being carried up the inclined faces 24 and 25 of the abutment, until the said axles engage the recesses or shoulders 26 and 27. When this occurs, the wheels can travel no farther and the vehicle is virtually supported by the abutment until the approaching extremities of the portions 14 of the track elements engage the wheels of the vehicle and lift the latter from the abutment, when the vehicle continues to travel in its course or orbit.

As shown in the drawing, the wheel is mounted to rotate upon a shaft or axle 28 whose extremities engage bearings 29. Interposed between the two wheel members at their centers is a sleeve 30 whose opposite extremities are engaged by washers 31, having interiorly projecting hub parts 32. The sleeve 30 forms a sort of casing to receive roller bearings 33 which come in direct contact with the axle 28. It must be understood, however, that my improved wheel may be mounted in any suitable manner, though it is of course preferred to use antifrictional bearings in order to protect the parts from undue wear.

As shown in the drawing, (see Fig. 5) platforms 34 are arranged on opposite sides of the wheel where the latter approaches nearest the ground, for the convenience of passengers in entering and leaving the cars. Each of these platforms is provided with an intermediate step 35.

From the foregoing description the use and operation of my improved wheel will be readily understood. Assuming that the wheel is traveling in the direction indicated by arrow $a$ Fig. 3, and if we assume that the wheel is in the position shown in said figure, one of the cars 8 is mounted upon the abutment and the other cars of the various orbits occupy positions which they have assumed by gravity, each car or vehicle being confined to its own individual orbit by the various switches employed as heretofore explained.

In Fig. 1 a slightly different construction of wheel is illustrated from the fact that reinforcing rods 36 are shown applied to the outer surface of the wheel. These rods are connected at one extremity to brackets 37 while their opposite extremities are secured by the tie-rods 7. These rods may be used or not, as may be desired.

Attention is also called to the fact that the vehicle orbits with which the wheel is equipped, are each formed of a number of irregularly curved track portions whereby the speed of the vehicle during the operation of the wheel, may be properly controlled.

Having thus described my invention, what I claim is:

1. A wheel coaster mounted to rotate on a horizontal axis, and provided with a number of distinct, irregularly curved orbits and vehicles mounted to travel in the respective orbits, their movement being controlled by gravity as the wheel changes its position during rotation.

2. A wheel coaster provided with a number of distinct vehicle orbits, portions of the track of each orbit being common to the tracks of adjacent orbits, and means to prevent the vehicles of adjacent orbits from escaping therefrom, substantially as described.

3. A wheel provided with a number of distinct vehicle orbits, each orbit having portions of its track common to adjacent orbits, and means located at the junctions of the common track portions of adjacent orbits, whereby as any vehicle passes to the portion of its orbit common to another orbit, the said vehicle is prevented from entering another orbit, substantially as described.

4. A wheel mounted to rotate and composed of a number of vehicle orbits, each orbit having a portion common to another orbit, the wheel being provided with switches operated by gravity whereby the various vehicles are confined within their own orbits, substantially as described.

5. A wheel coaster mounted to rotate on a horizontal axis and composed of two wheel members suitably spaced to receive vehicles, each wheel member having track elements forming a number of distinct orbits adapted to respectively receive a corresponding number of vehicles, each vehicle being confined within its own orbit and its movement being controlled by gravity alone as the wheel rotates, substantially as described.

6. A wheel mounted to rotate and composed of two wheel members suitably spaced, each wheel member having corresponding track elements, the two adjacent track elements of each wheel member constituting a vehicle orbit, a part of which is common to an adjacent orbit, and switches located at the extremities of the common orbit portions, substantially as described.

7. A wheel coaster composed of two wheel members, suitably spaced to receive vehicle bodies and provided with track elements adapted to receive the wheels of the vehicles, the adjacent track elements of the two wheel members constituting a number of distinct vehicle orbits, each orbit having a portion common to an adjacent orbit, and means for bracing the track elements of each wheel member, substantially as described.

8. A wheel coaster mounted to rotate on a horizontal axis and provided with a number of distinct vehicle orbits, each orbit being composed of a number of irregularly curved track portions, whereby the speed of the vehicles may be controlled, substantially as described.

9. A wheel coaster mounted to rotate on a horizontal axis, and provided with a number of distinct, irregularly curved orbits and vehicles mounted to travel in said orbits as the wheel rotates, the movement of the vehicles being due to gravity acting thereon as the wheel changes its position during its rotary movement.

In testimony whereof I affix my signature in presence of two witnesses.

LOGAN R. VALENTINE.

Witnesses:
A. J. O'BRIEN,
LOUISE COSNER.